(12) United States Patent
Ebey

(10) Patent No.: US 6,352,279 B1
(45) Date of Patent: Mar. 5, 2002

(54) BALL CLAMP TRAILER COUPLER

(75) Inventor: Edward Wayne Ebey, Wausau, WI (US)

(73) Assignee: Fulton Performance Products, Inc., Mosinee, WI (US)

( * ) Notice: Subject to any disclaimer, the term of this patent is extended or adjusted under 35 U.S.C. 154(b) by 0 days.

(21) Appl. No.: 09/138,059

(22) Filed: Aug. 21, 1998

(51) Int. Cl.[7] .............................................. B60R 16/00
(52) U.S. Cl. ...................................... 280/513; 280/507
(58) Field of Search ............................... 280/507, 508, 280/434, 504, 511, 513

(56) References Cited

U.S. PATENT DOCUMENTS

| | | | |
|---|---|---|---|
| 2,090,113 A | | 8/1937 | Dayton |
| 2,143,322 A | * | 1/1939 | Knobel |
| 2,149,189 A | | 2/1939 | Shaffer |
| 2,166,208 A | * | 7/1939 | Dayton |
| 2,170,980 A | | 8/1939 | Thorp et al. |
| 2,178,094 A | * | 10/1939 | Berluti |
| 2,204,882 A | | 6/1940 | Berluti |
| 2,363,755 A | | 9/1943 | Smith |
| 2,726,099 A | | 3/1955 | Nunn, Jr. |
| RE24,362 E | | 9/1957 | Nunn, Jr. |
| 2,823,931 A | * | 2/1958 | Schrader ..................... 280/513 |
| 3,130,993 A | | 4/1964 | McCleary |
| 3,773,358 A | * | 11/1973 | Butler ........................ 280/513 |
| 3,954,286 A | | 5/1976 | Weber |
| 4,241,935 A | | 12/1980 | Vollmer et al. |
| 5,344,174 A | | 9/1994 | Sanders |

* cited by examiner

Primary Examiner—Christopher P. Schwartz
Assistant Examiner—C. T. Bartz
(74) Attorney, Agent, or Firm—Craig A. Fieschko, Esq.; DeWitt Ross & Stevens S.C.

(57) ABSTRACT

A ball clamp trailer coupler for engaging a standard vehicle hitch ball includes a coupler housing wherein a forward coupler socket is defined, and a ball clamp which is movably situated within the coupler housing rearwardly of the coupler socket. The clamp has a clamping face which faces the coupler socket, and the clamping face slopes downwardly as it extends forwardly to conclude at a frontwardly-protruding lower clamping face edge. The clamp also includes a ramp face which slopes downwardly and rearwardly from the lower clamping face edge. When the coupler is lowered onto a hitch ball with the coupler located too far forwardly, i.e., so that the hitch ball is situated beneath the clamp, the hitch ball will contact the ramp face to push the clamp rearwardly out of the coupler socket rather than into the coupler socket (as will occur where the ramp face is not present). The coupler socket is thereby left unobstructed by the clamp, allowing easier insertion of the hitch ball prior to tightening the clamp to engage the hitch ball within the coupler socket.

10 Claims, 4 Drawing Sheets

PRIOR ART

PRIOR ART

BALL CLAMP TRAILER COUPLER

FIELD OF THE INVENTION

This disclosure concerns an invention relating generally to clamping implements, and more specifically to ball clamps for engaging hitch balls such as those used on vehicles.

SUMMARY OF THE INVENTION

The invention is directed to an improved ball clamp trailer coupler of the type noted above wherein the ball clamp includes a rearwardly and downwardly descending ramp beneath the lower clamping face edge. When this ramp is present, if a user attempts to lower the coupler onto the hitch ball when the coupler is too far forwardly situated (i.e., when the bottom of the ball clamp is situated above the hitch ball), the hitch ball contacts the ramp and pushes the clamp to swing rearwardly within the interior of the coupler housing. The clamp is thereby swung out of the way of the insertion of the hitch ball, allowing the hitch ball to enter the socket opening and coupler socket.

BACKGROUND OF THE INVENTION

Figure 1:
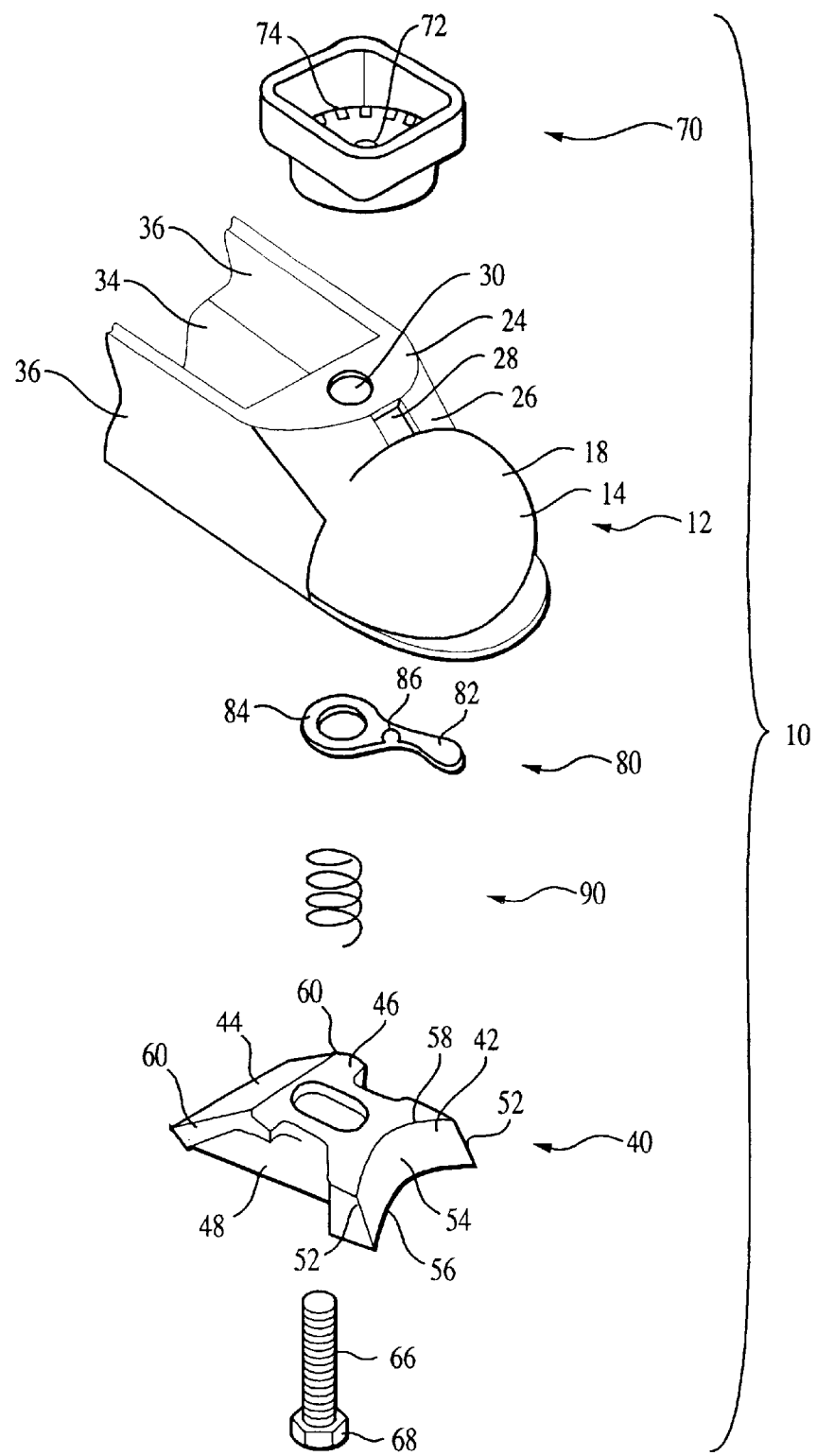
FIG. 1 is an exploded perspective view of a prior ball clamp trailer coupler.
Figure 2:
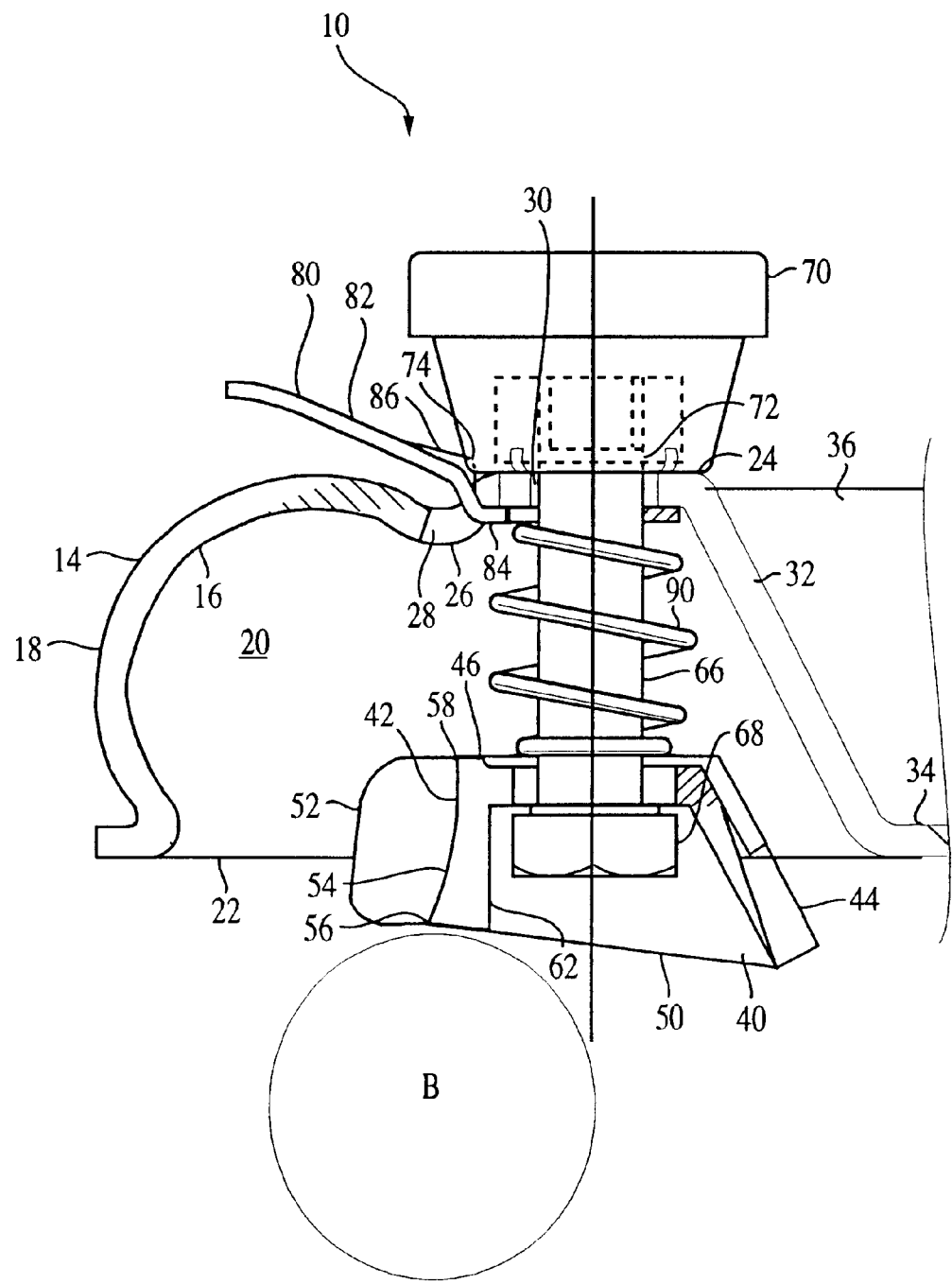
FIG. 2 is a sectional side elevational view of the prior ball clamp trailer coupler of FIG. 1.

With reference to the accompanying drawings labeled FIGS. 1 and 2, a prior art ball clamp trailer coupler is designated generally by the reference numeral 10. Such a coupler 10 is exemplified by the Model 308 coupler manufactured by Fulton Performance Products, Inc. of Mosinee, Wis., U.S.A. In FIG. 2, the coupler 10 is shown with a spherical trailer hitch ball B which is intended to be received by the coupler 10 and locked therein between a coupler housing 12 and a coupler ball clamp 40, each of which will now be discussed in turn.

The coupler housing 12 includes a housing socket wall 14 having generally semispherical interior and exterior surfaces 16 and 18 (that is, the interior and exterior surfaces 16 and 18 have contours which generally correspond to a portion of a spherical surface). The interior surface 16 of the housing socket wall 14 defines a coupler socket 20 having a bottom socket opening 22, and which is shaped generally complementary to the hitch ball B. As best shown in FIG. 1, along the top of the coupler 10, the housing socket wall 14 is connected to a substantially planar and generally horizontally oriented housing top wall 24 via a housing upper bridge wall 26 having a latch aperture 28 defined therein. The housing top wall 24 has a bolt aperture 30 defined therein. As best shown in FIG. 2, a downwardly-sloping housing guide wall 32 extends rearwardly from the housing top wall 24. The housing guide wall 32 is thereby shaped so that it converges toward the interior of the coupler housing 12 as it grows closer to the housing top wall 24, and it thereby serves to guide the ball clamp 40 toward the coupler socket 20 as the ball clamp 40 is drawn upwardly into the interior of the coupler housing 12, as will be discussed in greater detail below. A connecting member 34 then extends rearwardly from the housing guide wall 32 to connect to a trailer (not shown). Along the lateral sides of the coupler 10, coupler sidewalls 36 extend rearwardly from the housing socket wall 14 in generally parallel fashion and laterally bound the housing guide wall 32 and connecting member 34.

The ball clamp 40 includes a front clamping face 42 situated opposite the housing socket wall 14; a rear guide face 44 situated opposite the housing guide wall 32 of the coupler housing 12; and a top clamp surface 46, opposing side clamp surfaces 48, and a bottom clamp surface 50, all of which extend between the front clamping face 42 and rear guide face 44. The front clamping face 42 is arcuately curved along its lateral width (as best shown in FIG. 1) so as to define outwardly-protruding lateral clamping face sides 52 situated forward of a central clamping face region 54, and it additionally curves slightly outwardly from the top clamp surface 46 to the bottom clamp surface 50 (as best shown in FIG. 2) and thereby has an outwardly-protruding lower clamping face edge 56 situated forwardly with respect to an upper clamping face edge 58. As a result, the front clamping face 42 is roughly semispherical so that it can engage the hitch ball B against the interior surface 16 of the housing socket wall 14 with a substantially complementary grip. The rear guide face 44 and top clamp surface 46 are each substantially planar, and as best shown by FIG. 2, they are aligned with respect to each other in generally the same fashion as the alignment of the housing top wall 24 with respect to the housing guide wall 32 of the coupler housing 12. As a result, when the ball clamp 40 is drawn upwardly with the top clamp surface 46 approaching the housing top wall 24, the rear guide face 44 will eventually contact the housing guide wall 32 so that the ball clamp 40 is pushed forwardly, driving the clamping face 42 toward the interior surface 16 of the housing socket wall 14 (and against any hitch ball B resting within the coupler socket 20). When this occurs, the protruding lower clamping face edge 56 constricts the socket opening 22 to such an extent that the hitch ball B cannot exit the coupler socket 20. As best shown by FIG. 1, the side clamp surfaces 48 bear laterally protruding lands 60 which rest closely adjacent to the coupler sidewalls 36, thereby maintaining the ball clamp 40 so that its clamping face 42 faces forwardly as it moves within the coupler housing 12. As best shown in FIG. 2, the bottom clamp surface 50 includes a concave depression 62, the purpose of which will be explained below. A clamp bolt aperture 70 extends between the bottom clamp surface 50 and the top clamp surface 46.

With reference to FIG. 2, a threaded clamp bolt 66 is extended through the clamp bolt aperture 70, and additionally through the housing bolt aperture 30 in the housing top wall 24, to be threadably engaged to a hand wheel 70 within a wheel bolt aperture 72. This hand wheel 70 includes a series of tooth cavities 74 arrayed in a circular path about the bolt aperture 72, the purpose of which will be explained below. The clamp bolt 66 includes a bolt head 68 which complementarily fits within the concave depression 62 in the bottom clamp surface 50, thereby preventing rotation of the bolt head 68 therein. Owing to the foregoing construction, rotation of the hand wheel 70 will threadably retract or extend the clamp bolt 66 within the interior of the coupler housing 12, thereby driving the ball clamp 40 upwardly or downwardly toward or away from the housing top wall 24 and thus driving the clamping face 42 of the ball clamp 40 toward or away from the coupler socket 20. The hand wheel 70 cannot fit through the aperture 30 in the coupler housing 12, and it thereby maintains the clamp bolt 66 within the interior of the coupler housing 12. The bolt aperture 30 is sized to avoid interference between the threading on the clamp bolt 66 and the coupler housing 12, and to allow the clamp bolt 66 and ball clamp 40 to swing relatively freely forwardly and rearwardly within the coupler housing 12. However, the ball clamp 40 cannot swing laterally to any significant extent owing to the aforementioned close spacing between the clamp lands 60 and the coupler sidewalls 36.

A latch 80 is then provided to prevent undesired rotation of the hand wheel 70. As best shown by FIG. 1, the latch 80 includes a handle 82, an annular section 84, and a tooth 86 protruding upwardly from the handle 82 near the juncture of the handle 82 and the annular section 84. As shown in FIG. 2, the latch 80 is installed in the coupler 10 with the annular section 84 loosely encircling the clamp bolt 66, and with its handle 82 and tooth 86 protruding from the latch aperture 28 in the housing upper bridge wall 26. The latch 80 is thereby pivotally borne within the coupler housing 12 so that its handle 82 may be depressed or raised, thereby causing the tooth 86 to disengage or engage the tooth cavities 74 formed in the hand wheel 70. As a result, rotation of the hand wheel 70 is allowed or prevented. A compression spring 90 is interposed between the latch 80 and the ball clamp 40 to maintain the tooth 86 in a normally engaged position with respect to the hand wheel 70. If desired, the tooth 86 may be aligned at an angle so that rotation of the hand wheel 70 in one direction pushes against the angled surface of the tooth 86 and disengages it from the tooth cavity 74 wherein it rested, but the hand wheel 70 cannot be rotated in the opposite direction unless the handle 82 is depressed to move the tooth 86 out of the tooth cavities 74. The angled tooth 86 thus serves as a ratcheting catch for the hand wheel 70.

When operating the coupler 10, the user positions a trailer (which is not shown, but which is attached to the connecting member 34) so that the hitch ball B is located generally below the socket opening 22 of the coupler socket 20. The user then positions the coupler 10 downwardly so that the hitch ball B enters the socket opening 22 and pushes the free-swinging ball clamp 40 toward the housing guide wall 32, with the hitch ball B fitting into the coupler socket 20. The user then turns the hand wheel 70 to draw the clamp bolt 66 upwardly, thus pulling the ball clamp 40 upwardly so that its guide face 44 bears against the housing guide wall 32 of the coupler housing 12. At the same time, the clamping face 42 of the ball clamp 40 moves toward the coupler socket 20 to push the hitch ball B against the socket wall 14 of the coupler housing 12. The hitch ball B is thereby firmly engaged within the coupler socket 20 of the coupler housing 12, with the lower clamping face edge 56 constricting the socket opening 22 to such an extent that the hitch ball B cannot escape. When the user later wishes to disengage the hitch ball B from the coupler 10, the user simply actuates the latch 80 so that the hand wheel 70 may be freely turned, and then rotates the hand wheel 70 to extend the ball clamp 40 out of the coupler housing 12 until sufficient clearance exists in the socket opening 22 that the hitch ball B can be removed from the coupler socket 20.

Despite the fact that the coupler 10 is in widespread use and is regarded to be superior owing to its firm positive grip on the hitch ball 90, it can sometimes be difficult to properly position the hitch ball B within the coupler socket 20. When a user positions the coupler 10 over the hitch ball B to engage it, difficulties are encountered if the hitch ball B rests too far rearwardly with respect to the coupler 10: as shown in FIG. 2, if the hitch ball B rests below the bottom surface 50 of the ball clamp 40, the hitch ball B can push the ball clamp 40 upwardly into the coupler socket 20 rather than outwardly. As a result, the ball clamp 40 obstructs entry of the hitch ball B within the socket opening 22 and coupler socket 20. This requires the user to raise the coupler 10 off of the hitch ball B, hold the ball clamp 40 out of the way, and reinsert the ball B into the coupler socket 20. This can be annoying and inconvenient, particularly where the user must lift a heavy trailer to manipulate the coupler 10.

DETAILED DESCRIPTION OF THE INVENTION

Figure 3:
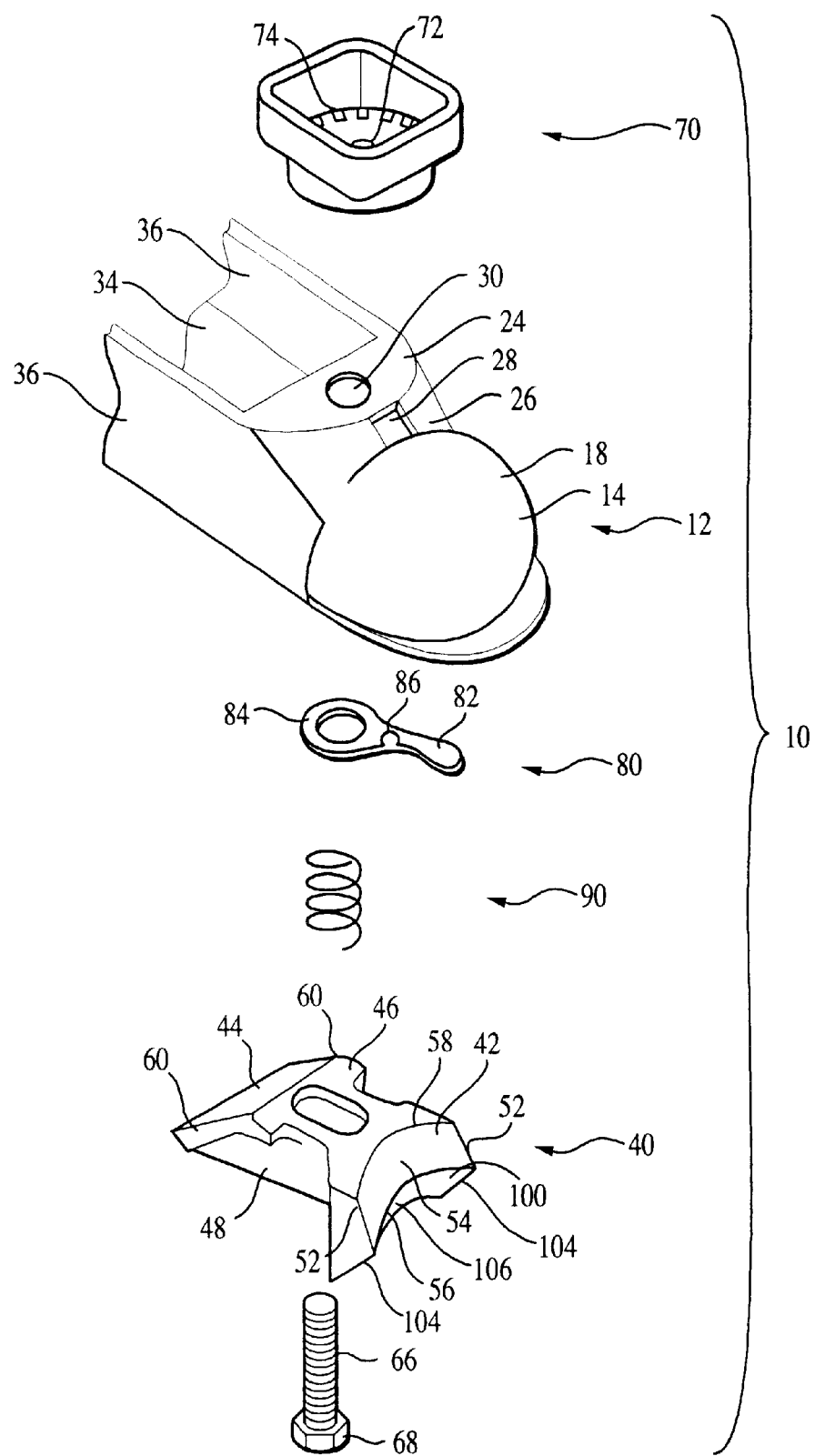
FIG. 3 is an exploded perspective view of an improved ball clamp trailer coupler.
Figure 4:
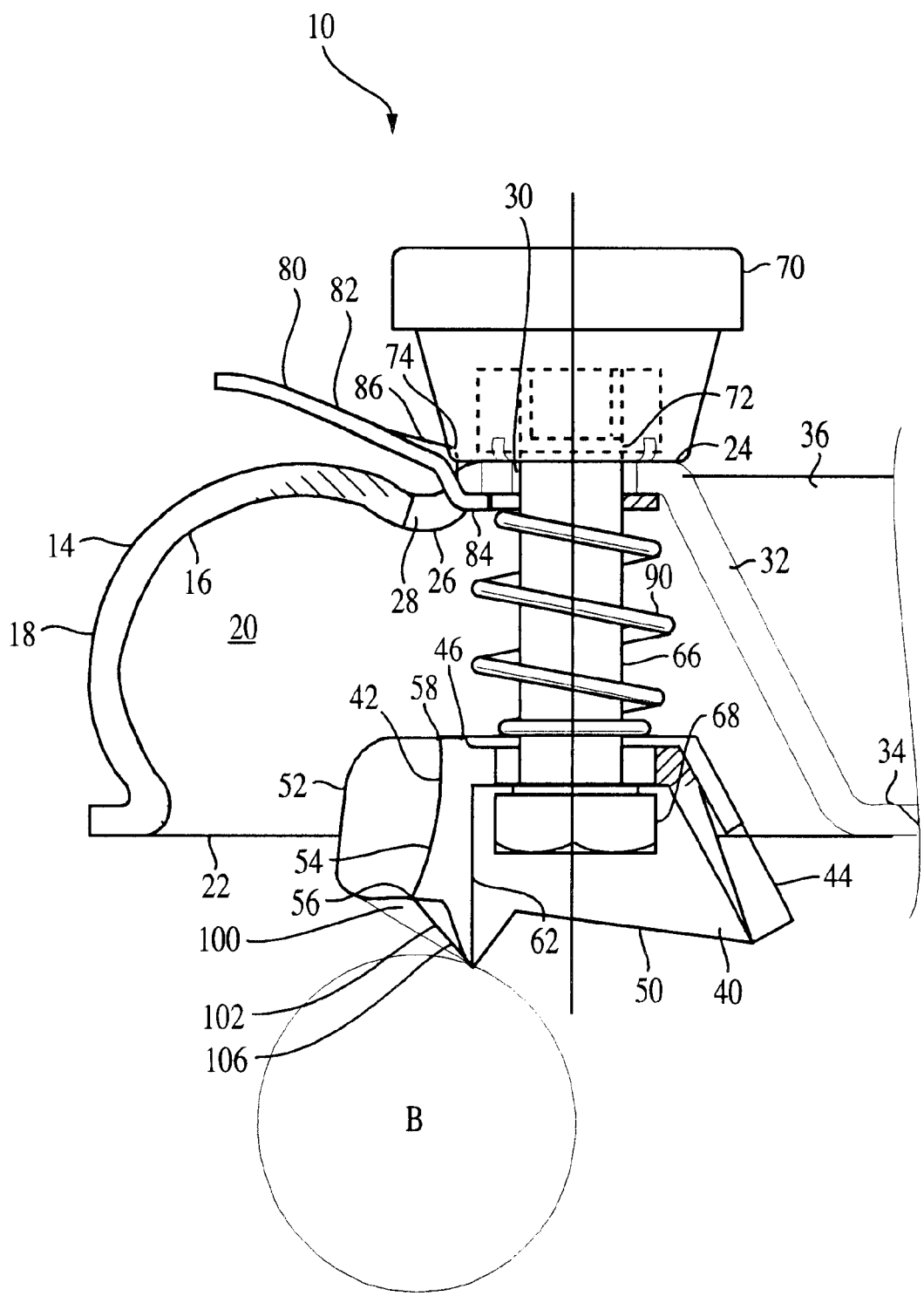
FIG. 4 is a sectional side elevational view of the improved ball clamp trailer coupler of FIG. 3.

FIGS. 3 and 4 then illustrate a preferred embodiment of the invention, with features described above in reference to FIGS. 1 and 2 being illustrated with the same reference numerals in FIGS. 3 and 4. In FIGS. 3 and 4, the ball clamp 40 includes a ramp 100 located beneath the lower clamping face edge 56. The ramp 100 includes a ramp face 102 which slopes downwardly and rearwardly from the lower clamping face edge 56 to the bottom surface 50 of the clamp 40. The ramp face 102 is arcuately curved along its lateral width (as best shown in FIG. 3) so as to define outwardly-protruding lateral ramp face sides 104 situated forward of a central ramp face region 106, and is preferably sloped linearly along planes sectioning the coupler 10 along its length (as shown by FIG. 4). Most preferably, the ramp face 102 is sloped at approximately 45° off of a vertical axis.

As a result of this arrangement, when the hitch ball B is advanced toward the coupler socket 20 but is partially located beneath the ball clamp 40 (as shown in FIG. 4), the hitch ball B will contact the ramp face 102 and push the ball clamp 40 out of the socket opening 22 and toward the housing guide wall 32 rather than into the coupler socket 20. Attachment of the coupler 10 to a hitch ball B is thereby accomplished in a single try, eliminating the frustration of the multiple tries commonly required to engage hitch balls to prior couplers.

It is understood that preferred embodiments of the invention have been described above in order to illustrate how to make and use the invention. The invention is not intended to be limited to these embodiments, but rather is intended to be limited only by the claims set out below.

What is claimed is:
1. A ball clamp trailer coupler comprising:
  a. a coupler housing including:
    (1) a housing top wall, and
    (2) a housing socket wall located forwardly of the housing top wall, the housing socket wall defining a coupler socket which opens onto a bottom socket opening,
  b. a ball clamp including:
    (1) a top surface,
    (2) an opposing bottom surface,
    (3) a clamping face which slopes forwardly and downwardly from the top surface,
    (4) a concave ramp face which slopes rearwardly and downwardly from the clamping face to the bottom surface, the ramp face including protruding lateral sides,
    (5) an aperture extending from the top surface to the bottom surface, wherein the ball clamp is situated within the coupler housing with the clamping face and ramp face opposite the coupler socket,
  c. a screw extending within the aperture, the screw being actuatable to move the top surface of the ball clamp toward and away from the housing top wall.
2. The ball clamp trailer coupler of claim 1 wherein the clamping face is concave and includes protruding lateral sides.

3. The ball clamp trailer coupler of claim 1 wherein the ball clamp further includes a guide face situated opposite the clamping face and ramp face, and also between the top and bottom faces, the guide face being situated at an angle with respect to the top surface, and wherein vertically moving the clamp so that its top surface approaches the housing top wall causes the guide face to contact the coupler housing, thereby pushing the clamp forwardly so that the clamping face moves toward the coupler socket.

4. The ball clamp trailer coupler of claim 1 wherein the ball clamp has a forwardly-protruding lower clamping face edge between the clamping face and the ramp face, whereby extending the ball clamp within the coupler socket causes the lower clamping face edge to constrict the bottom socket opening.

5. The ball clamp trailer coupler of claim 1 wherein the clamping face is concave.

6. The ball clamp trailer coupler of claim 1 further comprising a hand wheel rotatably engaged to the screw outside the coupler housing.

7. The ball clamp trailer coupler of claim 1 further comprising:

a. a hand wheel rotatably engaged to the screw outside the coupler housing, b. a latch encircling at least a portion of the screw, the latch having a tooth protruding therefrom, and c. a spring inteposed between the latch and the ball clamp, wherein the hand wheel bears one or more tooth cavities therein, and further wherein the spring biases the latch to have the tooth engage one of the tooth cavities.

8. The ball clamp trailer coupler of claim 1 wherein the ball clamp further includes a guide face situated opposite the clamping face and ramp face, and also between the top and bottom faces, the guide face being sloping rearwardly and downwardly from the top surface;

and wherein the coupler housing includes a housing guide wall sloping rearwardly and downwardly from the housing top wall, whereby vertically moving the guide face of the ball clamp against the housing guide wall also horizontally repositions the ball clamp within the coupler socket.

9. The ball clamp trailer coupler of claim 1 wherein moving the top surface of the ball clamp toward the housing top wall also moves the clamping face forwardly.

10. The ball clamp coupler of claim 1 wherein the ball clamp is pivotable toward the housing socket wall.

* * * * *